United States Patent [19]

Haass

[11] 4,086,428
[45] Apr. 25, 1978

[54] CIRCUIT ARRANGEMENT FOR THE AUTOMATIC ADJUSTMENT OF A TWO-WIRE FULL DUPLEX DATA TRANSMISSION SYSTEM

[75] Inventor: Adolf Haass, Munich, Germany
[73] Assignee: Siemens Aktiengesellschaft, Munich, Germany
[21] Appl. No.: 793,532
[22] Filed: May 4, 1977
[30] Foreign Application Priority Data
May 4, 1976  Germany .............................. 2619712
[51] Int. Cl.² ............................................. H04L 5/14
[52] U.S. Cl. ..................................................... 178/60
[58] Field of Search ................... 178/58 R, 59, 60, 57; 343/175, 176

[56] References Cited
U.S. PATENT DOCUMENTS

| | | | |
|---|---|---|---|
| 4,012,590 | 3/1977 | Haass | 178/58 R |
| 4,052,556 | 10/1977 | Haass | 178/60 |

Primary Examiner—Thomas A. Robinson
Attorney, Agent, or Firm—Schuyler, Birch, Swindler, McKie & Beckett

[57] ABSTRACT

In a two-wire, full duplex data transmission system a circuit arrangement is described for carrying out an automatic adjustment of the value of the current flowing from the transmitter in a given station to a receiver therein relative to the value of the current supplied to that receiver from another station over a transmission line. A balancing circuit receives the station transmitter current and divides it into a plurality of sub-currents which are subsequently recombined and conducted to the station's receiver. The station transmitter current and the received current values are compared, and a voltage proportional to the difference is produced. That voltage is utilized by a regulating stage to produce a number of regulating voltages corresponding to the number of sub-current carrying branches in the balancing circuit for regulating the amplification of the sub-currents.

4 Claims, 8 Drawing Figures

4,086,428

CIRCUIT ARRANGEMENT FOR THE AUTOMATIC ADJUSTMENT OF A TWO-WIRE FULL DUPLEX DATA TRANSMISSION SYSTEM

BACKGROUND OF THE INVENTION

The invention relates to a circuit arrangement for the automatic adjustment of a two-wire full duplex data transmission system, in which a transmitter and a receiver in one station are connected via two lines to a further transmitter and a further receiver in another station, and wherein data flows in both directions between the two stations.

Known balancing resistors are formed from a plurality of parallel-connected time constant elements having adjustable capacitors and resistors. In the event of a change in the capacitance of the capacitors and a change in the resistances, not only the time constant of the relevant time constant element, but also the amplitude characteristics of the balancing resistor undergo a change. Due to the mutual influencing of the capacitors and resistors which must be adjusted, the desired compensation for these changes is time consuming and requires an iterative process of long duration. Thus, this process has the disadvantage that it can only be carried out by trained personnel. Further, the variable capacitances are generally constructed as fixed capacitors in combination with step switches, which requires a relatively large expense for construction.

A circuit arrangement is known for adjusting a two-wire full duplex data transmission system in which a plurality of parallel-connected series combinations are provided, and in which sub-currents flow from the transmitter to the receiver in the same station via the series combinations. These series combinations contain time stages and produce time signals which possess a determinate phase state to an edge of the data signal and determine the beginning and end of the sub-currents. Also the series combinations each contain an amplitude stage which emit amplitude signals whose amplitudes are adjustable. Although this known circuit arrangement very much simplifies the adjustment of the two-wire full duplex data transmission system, in many cases it can be advantageous to carry out the adjustment, not manually, but automatically.

An object of the invention is, therefore, to provide a circuit arrangement by means of which the adjustment of a two-wire full duplex data transmission system can be carried out automatically.

SUMMARY OF THE INVENTION

The foregoing and other objects are realized by using a series combination generally arranged in the manner described above and which contains an amplitude stage whose amplification and/or attenuation is dependent upon a regulating voltage. For each series combination a multiplication stage is provided which via its output emits a multiplicative signal which corresponds to the product of the signals present at its two inputs. The voltage produced in the receiver is present at one input of each of the multiplication stages, and time signals which assume different amplitudes during the occurrence of the data signals are present at the other inputs of the multiplication stages. For each series combination an integrator is provided which receives the output of the assigned multiplication stage with the multiplicative signal and which emits the regulating voltage to the assigned amplitude stage.

Since it operates automatically, the circuit arrangement of the invention is characterized in that it can be used without time loss directly in association with two-wire full duplex data transmission systems without the need to take into account the length of the lines via which the data are transmitted.

If a relatively low transmitting voltage and a relatively low internal resistance are to be employed in a given subscriber station, it is advantageous to provide in the receiver a subtracter stage by means of which the difference is formed between the currents, of which one flows via the lines to the receiver and of which the other flows via the balancing circuit to the receiver. The output of the subtracter stage is connected to an amplifier which emits the voltage which is proportional to the current difference.

If the circuit arrangement in accordnace with the invention is constructed as an analog circuit, it is desirable to provide for each series combination a time stage which, considered from the transmitter, is arranged prior, in terms of current flow, to the associated amplitude stage and which emits the time signal to the relevant multiplication stage and to the amplitude stage.

If the circuit arrangement in accordance with the invention is a digital circuit, it is generally desirable that in respect of each series combination, viewed from the transmitter, are arranged firstly the amplitude stages and then the time stages. For each series combination a further time stage is in each case provided and is connected to the transmitter; these further time stages produce the time signals for the multiplication stages.

BRIEF DESCRIPTION OF THE DRAWINGS

In the following, preferred embodiments of the invention will be described making reference to FIGS. 1 to 8, where identical components appearing in more than one figure have been provided with like references.

DETAILED DESCRIPTION OF THE PREFERRED EMBODIMENTS

Figure 1:
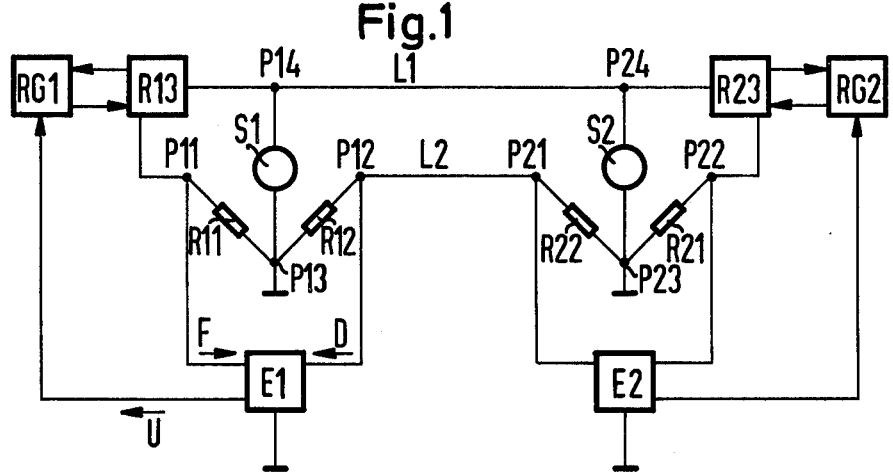
FIG. 1 is a block circuit diagram of a two-wire full duplex data transmission system in which the circuit arrangement of the invention is used.

The data transmission system illustrated in FIG. 1 transmits data from a first station via the lines L1 and L2 to a second station and vice versa. The first station comprises transmitter S1, receiver E1, resistors R11, R12, R13 and regulating stage RG1. The second station comprises transmitter S2, receiver E2, resistors R21, R22, R23 and regulating stage RG2. Since the stations are of similar construction, in the following only one station will be described in detail.

The resistors R11 and R12, which are designed to be identical, form a first and a second bridge resistor. A third bridge resistor is formed by the lines L1, L2 and by the components connected via the circuit points P21 and P24. The fourth bridge resistor is formed by the balancing resistor R13. The transmitter S1 lies in one diagonal of this bridge circuit and the receiver E1 is arranged at the other diagonal points. A full-duplex operation across the two lines L1 and L2 necessitates that the balancing resistor R13 should simulate as accurately as possible the bridge resistor which is connected to the circuit points P12 and P14.

Figure 2:
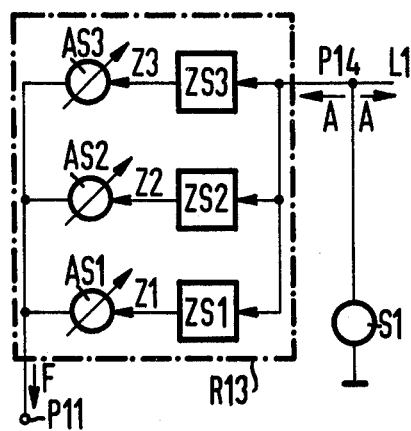
FIGS. 2 and 3 are more detailed schematic views of a balancing circuit illustrated in FIG. 1.

FIG. 2 shows a balancing circuit having three series combinations, each constituted by a time stage and an amplitude stage. To simplify the illustration, only three series combinations have been shown, whereas in practice it can be advantageous to provide a greater number of these series combinations. The first and second and third series combinations consist of the amplitude stages AS1, AS2, and AS3, respectively, and of the time stages ZS1, ZS2, and ZS3, respectively. These series combinations lie in the balancing circuit which is formed by the transmitter S1, by the circuit point P14, by the series combinations, by the circuit point P11, and by the receiver E1 illustrated in FIG. 1. Via the individual series combinations, sub-currents are fed in which flow across the circuit point P11 and combine to form a sum current F within the balancing circuit. The time stages ZS1, ZS2 and ZS3 emit time signals Z1, Z2 and Z3, respectively, which possess a predetermined phase state relative to an edge of the data signal A which is emitted from the transmitter S1 to the line L1 and to the balancing circuit. The time signals Z1, Z2 and Z3 determine the beginning and end of the sub-currents through the series combinations.

In the adjustment of the balancing circuit, the amplitudes of the sub-currents flowing through the series combinations are established by the amplitude stages AS1, AS2, AS3 and regulating stage RG1 in such manner that the sum current F which flows from the transmitter S1 via the balancing resistor R13 to the associated receiver E1 is equal to the current D flowing from the transmitter S1 via the lines L1 and L2 to the receiver.

Figure 3:
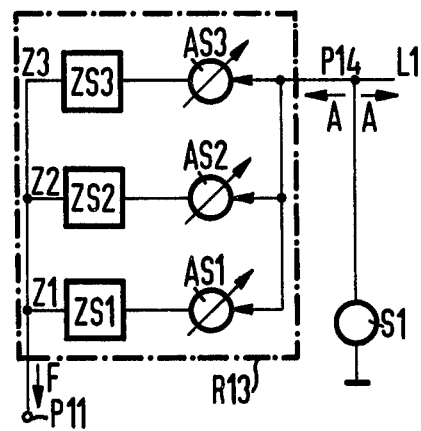

The balancing circuit illustrated in FIG. 3 differs from the balancing circuit illustrated in FIG. 2 due to the arrangement of the time stages and the amplitude stages. In accordance with FIG. 3, in contrast to FIG. 2, the amplitude stages AS1, AS2, AS3 are arranged on the side nearest the transmitter S1, and the time stages ZS1, ZS2, ZS3 are arranged on the side nearest the receiver E1.

Figure 4:
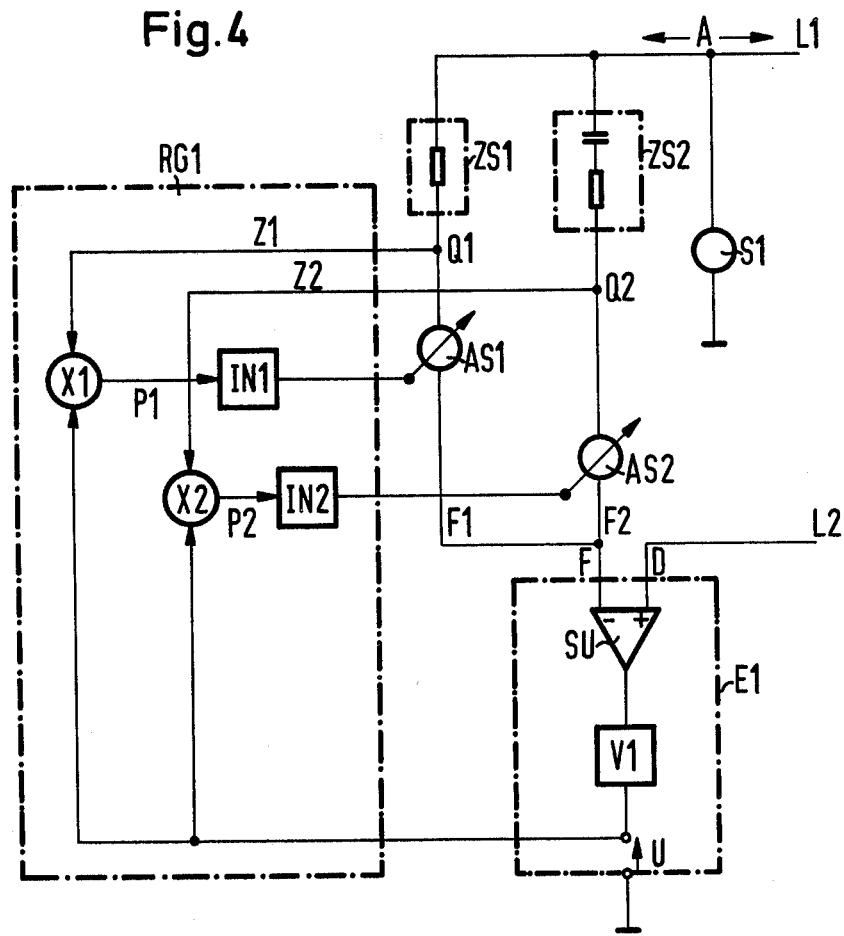
FIG. 4 is a detailed schematic diagram of a first embodiment of a circuit arrangement for automatic adjustment in which, in the region of the receiver, the difference in the line current and the balancing current is established.

FIG. 4 illustrates a circuit arrangement for the automatic adjustment of the balancing resistor R13 schematically illustrated in FIG. 2 or 3. To simplify the illustration, only two series combinations ZS1/AS1, ZS2/AS2 have been shown, whereas in practice generally it is desirable to provide a larger number of such series combinations. Here it has been assumed that the transmitter S1 emits the signal A which carries the data to be transmitted. This signal A is transmitted via the line L1 to the opposite station and is returned via the line L2 to the receiver in the station being described. Since the lines L1 and L2 are capacitively coupled in the usual manner, the signal A is deformed, so that a current D arrives at the input of the subtracter stage SU. The sub-currents F1 and F2 which flow through the series combinations ZS1/AS1, ZS2/AS2 together form the current F which is fed to a second input of the subtracter stage SU. When the transmitter S2 (not shown in FIG. 4) in the opposite station is not transmitting, the currents F and D are to be equal so that the receiver in the described station is not disturbed by the transmitter S1. Using the subtracter stage SU, the current difference D-F is thus determined and, using the amplifier V1, a voltage U is obtained which is proportional to the current difference D-F.

Each series combination is assigned, respectively, a multiplication stage X1, X2 and an integrator IN1, IN2, respectively. The multiplication stages are connected to connection points Q1, Q2 and thereby to the time signals Z1, Z2, and they are connected to receive the voltage U. The multiplicative signals P1 and P2, obtained from the multiplication stages X1 and X2, are supplied to the integrators IN1 and IN2, and the integrator outputs emit regulating voltages to the amplitude stages AS1 and AS2.

Figure 5:
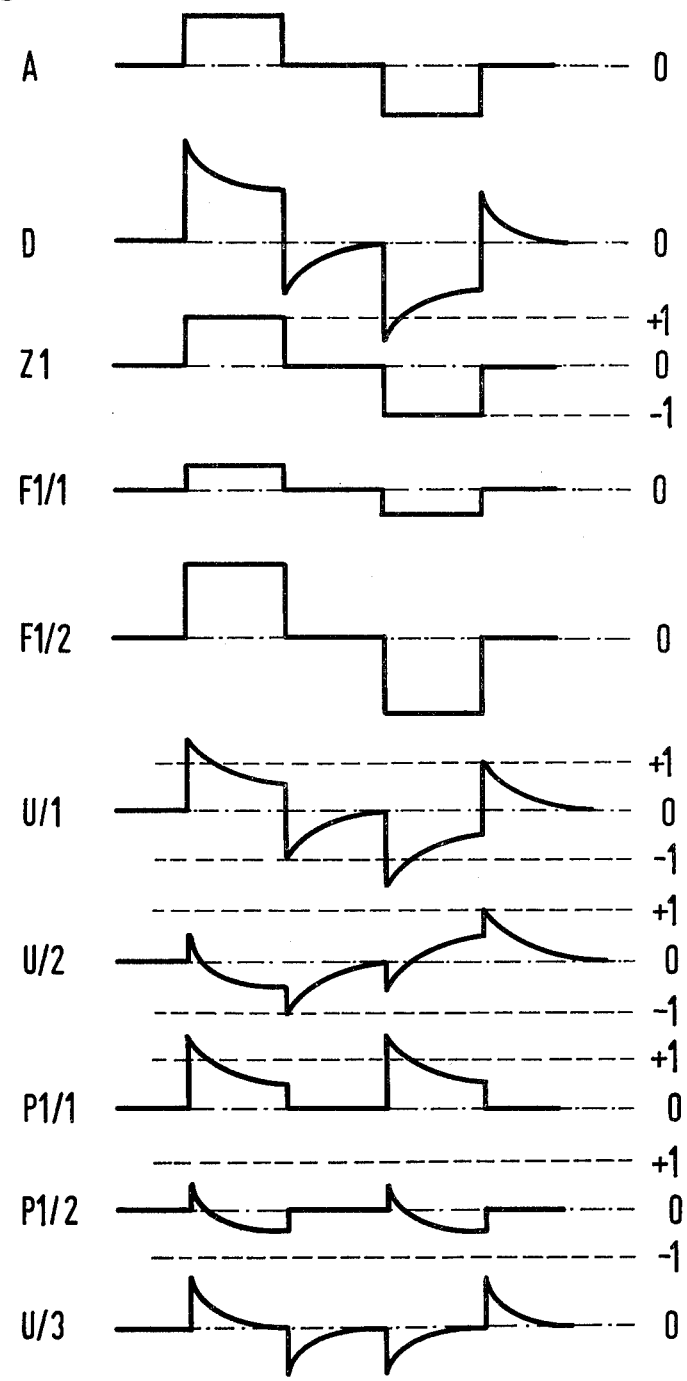
FIGS. 5 and 6 are time-waveform diagrams illustrating the mode of operation of the circuit arrangement illustrated in FIG. 4.
Figure 6:
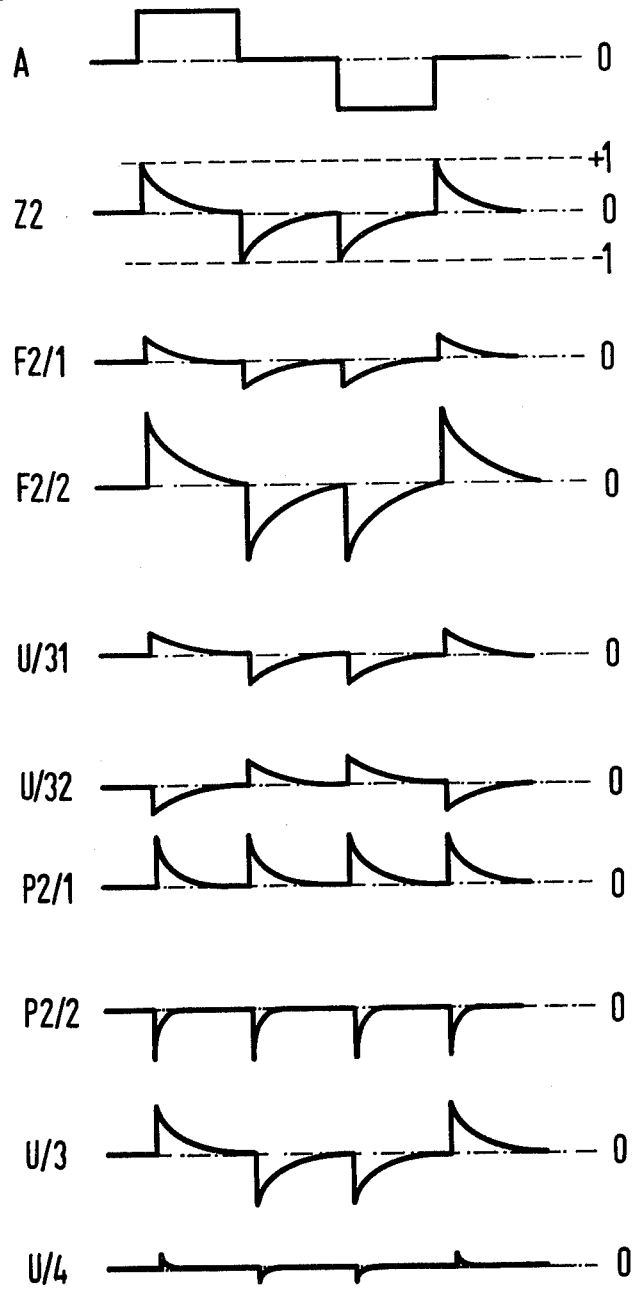

FIGS. 5 and 6 illustrate signals produced from the operation of the circuit arrangement illustrated in FIG. 4. The abscissa axis relates to time. It will be assumed that the transmitter S2 illustrated in FIG. 1 is currently not emitting any signal. With reference to FIG. 5, merely the mode of operation of the first series combination comprising the time stage ZS1 and the amplitude stage AS1 will be explained; it will be assumed that no other series combinations exist. Under this condition the sub-current F1 is equal to the sum current F.

The upper part of FIG. 5 illustrates signal A having a positive and negative pulse above and below the dash-dotted zero line. The signal D is present at the positive input of the subtracter stage SU. The time stage ZS1 is in the form of a resistor, so that the time signal Z1 emitted via the connection point Q1 is not deformed in relation to the signal A. The F1 differs merely in respect of the amplitudes from the time signal Z1. Two situations will be considered in which the amplitudes of the signal F1 are smaller and greater than those of the time signal Z1 so that the signals F1/1 and F1/2 are produced as corresponding variants of the signal F1. Under these conditions, two variants of the signal U are also produced, which are designated with the references U/1 and U/2 and have been illustrated. Their relationships to the signals F1/1 and F1/2 are defined, respectively, as follows:

$$U/1 = D - F1/1 \text{ and}$$

$$U/2 = D - F1/2$$

The multiplication stage X1 forms the product of the signals U and Z1. In accordance with the two variants of the signal F1 and the signal U, two variants referenced P1/1 and P1/2 are also produced for the multiplicative signal P1 producing the relationships:

$$P1/1 = Z1 \cdot U/1 \text{ and}$$

$$P1/2 = Z1 \cdot U/2.$$

The acquisition of the multiplicative signal P1/1 has been based on the assumption that the amplitudes of the signal Z1 are assigned the values +1, 0 and −1 entered in FIG. 5. The multiplicative signal P1/1 is 0 whenever the signal Z1 is 0. If the amplitudes of the signal Z1 assume the value +1, the multiplicative signal P1/1 is equal to the signal U/1. If the amplitude of the signal Z1 possesses the value −1, the corresponding portion of the signal U/1 is also negative, so that the multiplication produces a positive signal component. The multiplicative signal P1/1 thus possesses two positive signal components which, following smoothing in the integrator IN1, produce a positive regulating signal with which, using the amplitude stage AS1, the amplitude of the signal F1/1 is increased. However, the increase in the amplitude of the signal F1/1 results in a reduction in the amplitudes of the signal U/1, so that both the positive signal components and also the negative signal components are approximated to the value 0.

The multiplicative signal P1/2 is produced by multiplying the signal Z1 with the signal U/2, although now two greater negative signal components are formed which produce a negative regulating voltage following smoothing in the integrator IN1. Using the amplitude stage AS1 this negative regulating voltage produces a reduction in the amplitude of the signal F1/2 so that also in this case the amplitudes of the signal U/2 are approximated to the amplitude 0.

Both in the case of the signal U/1 and in the case of the signal U/2, the previously described regulating processes compensate only the d.c. components, not however the pulse peaks, so that the signal U/3 is produced subsequently to regulation.

The upper part of FIG. 6 illustrates the signal A which has been emitted from the transmitter S1. Now, a second series combination comprising the time stage ZS2 and the amplitude stage AS2 will be assumed to exist. Since the time stage ZS2 is in the form of a differentiator element consisting of a resistor and a capacitor, the signal Z2 is emitted at connection point Q2; signal Z2 is formed by the differentiation of the signal A. The amplitude stage AS2 merely alters the amplitude of the signal Z2.

Again, two situations will be investigated in which the amplitude of the signal F2 is assumed to be too small and too great so that two variants of this signal F2 are obtained which are referenced F2/1 and F2/2 and are illustrated in FIG. 6. However, it will be assumed that using the amplitude stage AS1 and using the multiplication stage X1 the signal U has already been influenced, so that considerations must be based on the signal U/3 as also illustrated in FIG. 5. In accordance with the two variants F2/1 and F2/2 of the signal F2, there are now also two variants of the signal U/3, which are referenced U/31 and U/32. The amplitudes of the signal U/31 are smaller than the amplitudes of the signal U/3, since the signal amplitudes of the signal F2/1 have also been assumed to be relatively small. The signals Z2 and U/31 possess the same polarity however. The conditions are different in the case of the signal U/32 since the large amplitudes of the signal F2/2 have modified the signal U/3 to a large extent in that the polarities of the signals Z2 and U/32 are now opposite.

Using the multiplication stage X2, the product of the signals U and Z2 is formed, and the multiplicative signal P2 so formed is fed to the integrator IN2. Since the two variants U/31 and U/32 of the signal U have been assumed to exist, again there are two variants of the multiplicative signal P2, which are provided with the references P2/1 and P2/2. As shown in FIG. 6, in the multiplication of the signal Z2 with the signal F2/1 only positive pulse peaks of the multiplicative signal P2/1 are formed which, having been smoothed in the integrator IN2, produce a positive regulating voltage. With this positive regulating voltage the amplitude of the signal F2/1 is increased and thus the signal amplitude of the signal F2/1, which has been assumed to be too small is counteracted. In contrast, in the case of the multiplication of the signals Z2 and F2/2, only negative pulse peaks are obtained which, having been integrated in the integration stage IN2, produce a negative regulating voltage. This negative regulating voltage and the amplitude stage AS2 are used to counteract the too high amplitude of the signal F2/2. The described regulating processes cause the signal U3 to be modified to the signal U4, whose amplitudes have been approximated to the value 0 in comparison to the amplitudes of the signal U/3.

Due to the use of a plurality of series combinations, for example due to the use of a plurality of RC-elements as time stages in series to amplitude stages, and corresponding multiplication stages and integrators, the signal amplitudes of the voltage U can be increasingly approximated to the amplitude 0, as a result of which there is also a simultaneous signalling of the reducing difference D−F and the substantial identity between the currents D and F which signifies a full adjustment of the balancing resistor R13.

In the description of FIGS. 4, 5 and 6 it was assumed that the receiver E1 contains a subtracter stage SU by means of which the difference in the currents D-F is formed. With optimum adjustment of the balancing resistor R13 illustrated in FIG. 1, the signals of the transmitter S1 illustrated in FIG. 1 do not prove disturbing to the receiver E1, because this difference D −F is negligible, whereas the signals of the transmitter S2 are fully effective in the receiver E1, so that the data transmission from the transmitter 2 to the receiver E1 can be effected in this way. However, data transmission can also be effected when the receiver E1 responds to the difference in the voltages which occur across the resistors R11 and R12.

Figure 7:
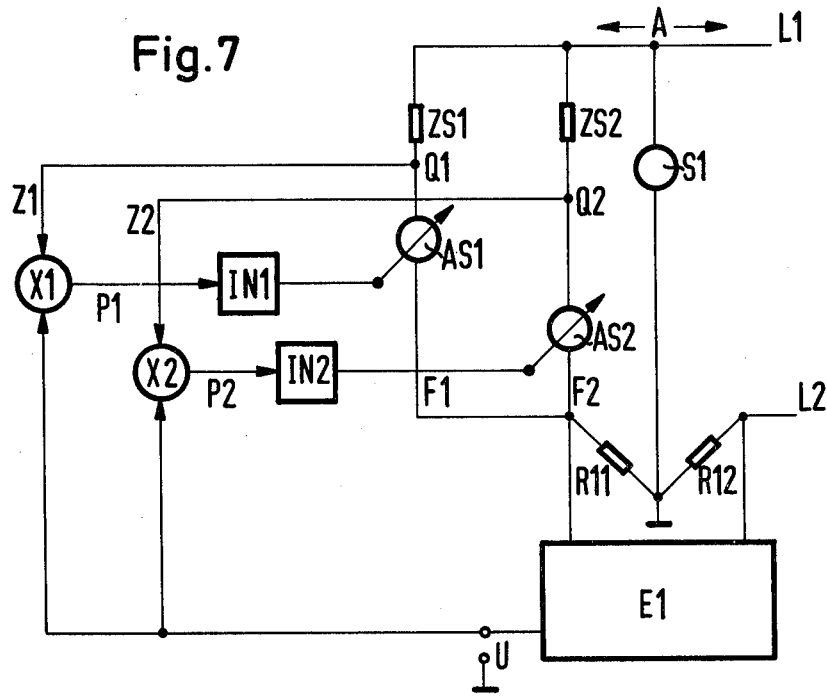
FIG. 7 is a detailed schematic diagram of a second embodiment of a circuit arrangement for automatic adjustment, in which, in the region of the receiver, the difference in the voltages occurring across two bridge resistors is determined.

FIG. 7 relates to the situation in which the receiver E responds to the difference in the voltages which occur across the resistors R11 and R12. The signal U directly signals this voltage difference. The automatic adjustment of the balancing circuits is effected in the same manner described with reference to FIG. 4.

The time stages ZS1 and ZS2 illustrated in FIGS. 4 and 7 produce time signals Z1 and Z2 which assume different amplitudes during the occurrence of the signals A. Thus the time signals Z1 and Z2 represent different time functions. The amplitude stages AS1 and AS2 merely change the amplitudes of the time signals Z1 and Z2 with which they are supplied, for which reason the sub-currents F1 and F2 occur at least partially in different time zones. This results in the advantage that the individual sub-currents F1 and F2 may be set up consecutively without it being necessary, in the setting up of one of the sub-currents, to alter the other sub-currents. The time signals Z1 and Z2 fulfill a double function inasmuch as they bring about the described classification in time not only for the sub-currents F1 and F2 but also for the regulating systems with the multipliers X1 and X2. It is important that the regulating voltages which are emitted from the integrators IN1 and IN2 relate to different time sections of the signal U.

Figure 8:
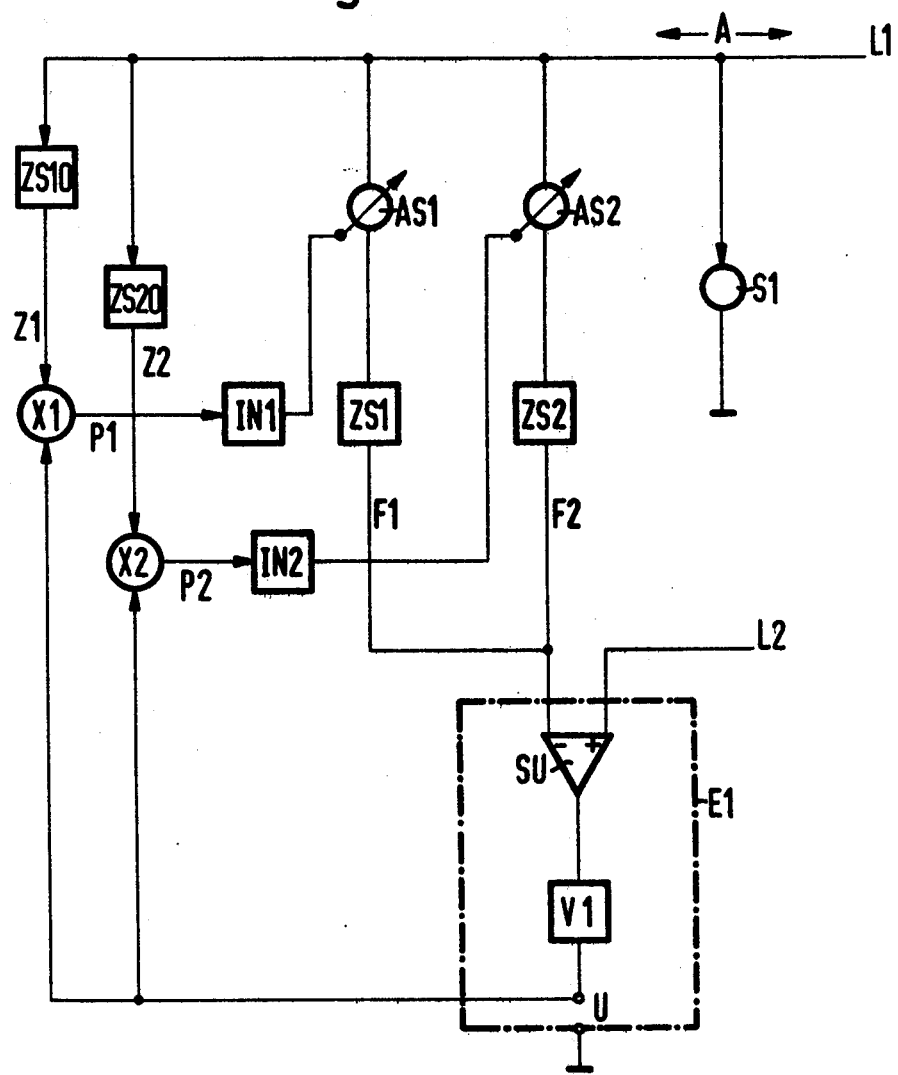
FIG. 8 is a detailed schematic diagram of a third preferred embodiment of a circuit arrangement for automatic adjustment, in which two time stages are provided for each series combination.

FIG. 8 shows another exemplary embodiment for the adjustment of a two-wire full-duplex data transmission system in which, considered from the transmitter S1, are arranged, firstly, the two amplitude stages AS1 and AS2 and then the corresponding time stages ZS1 and ZS2. The time stages ZS1 and ZS2 again fulfill the function that the sub-currents F1 and F2 occur in different time zones. If the amplitude stages AS1 and AS2 simultaneously emit signals for a given length of time, the time stages ZS1 and ZS2 cause these signals to be allowed through in various time zones for the given length of time. In this way, as already mentioned, the amplitude settings for the sub-currents F1 and F2 are moved into zones which are separate from one another in time, as a result of which individual of the sub-currents can be altered, whereas the remaining sub-currents are not changed.

The regulating systems comprising the multipliers X1 and X2 as already mentioned likewise necessitate regulating processes relating to different time sections of the signal U. In the case of FIG. 8 the time signals Z1 and Z2 are produced by special time stages ZS10 and ZS20. Thus with the aid of these time stages ZS10 and ZS20, those time zones of the signal U are established which are used to form the corresponding multiplicative signals P1 and P2 and the corresponding regulating signals.

Arbitrary combinations of resistors, capacitive impedances and inductive impedances are conceivable as time stages; in practice, RC elements are preferred.

The amplitude stages illustrated in FIGS. 2, 3, 4, 7, 8 can for example be regulatable attenuation elements, in particular variable resistors in the form of field effect transistors or motor potentiometers, the resistances of which are variable. However, regulating amplifiers, in particular operational amplifiers, can also be used as amplitude stages.

The exemplary embodiments which have been described making reference to FIGS. 1 to 8 are characterized in that in the region of the receiver E1 it is possible to carry out a signal level measurement which indicates possible short-circuits or interruptions in the two lines L1, L2. This level measurement can be carried out in the region of the receiver E1 either in dependence upon the voltage U or in dependence upon signals which are obtained at the circuit points P11 and P12. If, for example, the lines L1, L2 are interrupted and no current flows through them, the balancing resistor R13 is adjusted with the regulating stage RG1 in such manner that no current flows through the balancing resistor R13 also, which is indicated by the level measurement. If for example the lines L1, L2 are short-circuited and an increased current flows through the circuit points P14, P12, this results in a similarly increased current through the balancing resistor R13. In this case the currents flowing through the circuit point P11 to the receiver E1 and through the circuit point P12 to the receiver E1 are equal so that the difference between them is 0. In this case the level measurement thus indicates that no current is flowing from the opposite station to the receiver E1.

The principles of the invention have been described by describing the construction and operation of alternative preferred embodiments. It is contemplated that the described embodiments, as well as their described operating parameters, can be modified or changed in a variety of known ways while remaining within the scope of the invention as defined by the appended claims.

I claim:

1. In a full duplex data transmission system having subscriber stations interconnected by two wire lines, each subscriber station having a transmitter and a receiver, a circuit arrangement in each said subscriber station for automatically adjusting the value of current conducted from the transmitter in a given station to receive therein relative to the value of a received current transmitted from another of said stations, the circuit arrangement comprising:

balancing circuit means coupling current from said transmitter in the given station to the receiver therein, said balancing circuit comprising a plurality of branch circuits for dividing said transmitter current into a plurality of sub-currents, said sub-currents being recombined prior to coupling to said receiver, each said branch circuit being a series combination of a voltage responsive current adjusting means and a timing circuit, comparison means for receiving said transmitter current as supplied from said balancing circuit means and said received current and for producing an output voltage having a value proportional to the difference between the values of said transmitter current and said received current, and regulating circuit means for producing, responsive to said comparison means output voltage, regulating voltages coupled, respectively, to said current adjusting means for controlling the values of said sub-currents.

2. The circuit arrangement defined in claim 1 wherein said regulating means comprises:

a number of multiplier circuits equal to the number of said branch circuits, each said multiplier circuit being assigned to a said branch circuit and being connected at its inputs to receive and produce a product signal from said comparison means output voltage and the output from the said timing circuit in the assigned branch circuit, and a number of integrators, one of which is connected to the output of each said multiplier, the outputs of said integrators being connected, respectively, to control inputs of said current regulating means in the assigned branch circuits.

3. The circuit arrangement defined in claim 1 wherein in each said branch circuit, relative to the direction of current flow of said transmitter current, said current regulating means is arranged downstream of said timing circuit.

4. The circuit arrangement defined in claim 1 wherein in each said branch circuit, relative to the direction of current flow of said transmitter current, said timing circuit is arranged downstream of said current regulating means and further comprising:

a number of additional timing circuits equal to the number of said branch circuits, one of said additional timing circuits connecting each said branch circuit to an input of said regulating circuit means.

* * * * *